(12) United States Patent
Dixon (10) Patent No.: US 12,434,034 B2
(45) Date of Patent: Oct. 7, 2025

(54) HUMIDIFIERS FOR RESPIRATORY GASES

(71) Applicant: INTERSURGICAL AG, Vaduz (LI)

(72) Inventor: Phillip William Dixon, Wokingham (GB)

(73) Assignee: INTERSURGICAL AG, Vaduz (LI)

( * ) Notice: Subject to any disclaimer, the term of this patent is extended or adjusted under 35 U.S.C. 154(b) by 964 days.

(21) Appl. No.: 17/433,465

(22) PCT Filed: Feb. 25, 2020

(86) PCT No.: PCT/EP2020/054919
§ 371 (c)(1),
(2) Date: Aug. 24, 2021

(87) PCT Pub. No.: WO2020/173945
PCT Pub. Date: Sep. 3, 2020

(65) Prior Publication Data
US 2022/0143355 A1    May 12, 2022

(30) Foreign Application Priority Data
Feb. 25, 2019    (GB) ........................................ 1902508

(51) Int. Cl.
*A61M 16/16*    (2006.01)
*A61M 16/10*    (2006.01)

(52) U.S. Cl.
CPC ........ *A61M 16/161* (2014.02); *A61M 16/109* (2014.02); *A61M 16/162* (2013.01);
(Continued)

(58) Field of Classification Search
CPC ........ A61M 16/161; A61M 2205/3379; A61M 2205/3382; A61M 2205/3386;
(Continued)

(56) References Cited

U.S. PATENT DOCUMENTS 4,119,860 A * 10/1978 Gooley ............... G01F 23/2921
73/290 R
4,193,004 A * 3/1980 Lobdell ............... G01F 23/2925
250/577

(Continued)

FOREIGN PATENT DOCUMENTS

CN    109248366 A    1/2019
CN    209187903 U    8/2019
(Continued)

OTHER PUBLICATIONS

Bishop, Owen. Understand Amplifiers, Chapter 2—A simple amplifier. pp. 9-30. Newnes, 1998. ISBN 9780750637435. doi.org/10.1016/B978-075063743-5/50028-3. (Year: 1998).*

(Continued)

*Primary Examiner* — Brandy S Lee
*Assistant Examiner* — Nicholas B. Engel
(74) *Attorney, Agent, or Firm* — Troutman Pepper Locke LLP (Rochester)

(57) ABSTRACT

A sensor and method for determining the state of a humidification chamber in a respiratory gas humidifier. The sensor comprises a transmitter for emitting an electromagnetic radiation signal, a receiver for receiving the electromagnetic radiation signal and providing an output signal, and a controller for varying the intensity of the electromagnetic radiation signal emitted by the transmitter and/or the gain setting of the receiver. The controller has two sensor configurations, a first configuration in which the transmitter emits an electromagnetic radiation signal having a first intensity, the receiver has a first gain setting, and the receiver provides a first output signal, and a second configuration in which the transmitter emits an electromagnetic radiation signal having a second intensity, the receiver has a second gain setting, and the receiver provides a second output signal, wherein the first intensity is different to the second (Continued)

intensity, and/or the first gain setting is different to the second gain setting, and the controller determines a state of the humidification chamber by comparing the first and second outputs of the receiver with one or more threshold values.

17 Claims, 4 Drawing Sheets

(52) U.S. Cl.
CPC .............. *A61M 2205/3382* (2013.01); *A61M 2205/3386* (2013.01); *A61M 2205/35* (2013.01)

(58) Field of Classification Search
CPC .......... A61M 2205/3389; G01F 23/284; G01F 23/2845; G01F 23/288; G01F 23/2885; G01F 23/292; G01F 23/2921; G01F 23/2922; G01F 23/2924; G01F 23/2925; G01F 23/2927; G01F 23/2928; G01F 23/28; G01F 23/282; G01F 23/686; G01F 23/706; A61H 2033/0054; A61H 2201/5058
See application file for complete search history.

(56) References Cited

U.S. PATENT DOCUMENTS

| | | | | |
|---|---|---|---|---|
| 5,194,747 | A * | 3/1993 | Culpepper | G01F 23/292 250/577 |
| 5,747,824 | A * | 5/1998 | Jung | A61M 3/0201 250/577 |
| 6,078,729 | A | 6/2000 | Kopel | |
| 6,581,461 | B1 * | 6/2003 | Diaz | G01F 23/2928 73/290 R |
| 7,082,828 | B1 * | 8/2006 | Wilkins | B63B 25/082 73/319 |
| 7,872,746 | B2 * | 1/2011 | Gao | G01F 23/2921 356/627 |
| 8,159,660 | B2 | 4/2012 | Mimeault et al. | |
| 8,869,612 | B2 * | 10/2014 | Chen | G01F 23/26 73/304 C |
| 8,876,757 | B2 * | 11/2014 | Jacobson | A61F 9/00736 604/67 |
| 9,212,673 | B2 | 12/2015 | Korneff et al. | |
| 9,829,366 | B2 * | 11/2017 | Chen | A61M 1/1605 |
| 9,907,908 | B2 * | 3/2018 | Chen | A61M 1/1668 |
| 10,220,175 | B2 * | 3/2019 | White | A61M 16/0816 |
| 10,327,948 | B2 * | 6/2019 | Jacobson | A61M 5/172 |
| 10,426,914 | B2 * | 10/2019 | Giovannelli | G16H 20/17 |
| 10,488,245 | B2 * | 11/2019 | Gelada Camps | G01F 23/292 |
| 10,543,334 | B2 * | 1/2020 | Biba | A61M 16/107 |
| 11,280,726 | B2 * | 3/2022 | Degner | G01N 21/314 |
| 11,340,106 | B2 * | 5/2022 | Falger | G01S 13/88 |
| 11,554,235 | B2 * | 1/2023 | Biba | G01F 23/2922 |
| 11,744,976 | B2 * | 9/2023 | Biba | G01F 23/2922 128/205.12 |
| 2001/0015099 | A1 * | 8/2001 | Blaine | G01F 23/284 73/290 R |
| 2009/0013780 | A1 * | 1/2009 | Gao | A61M 1/73 73/293 |
| 2010/0170511 | A1 * | 7/2010 | Payne | A61M 16/167 137/423 |
| 2011/0026015 | A1 * | 2/2011 | Mimeault | G01S 7/4866 356/139.1 |
| 2011/0112472 | A1 * | 5/2011 | Jacobson | A61F 9/00736 604/67 |
| 2012/0167880 | A1 * | 7/2012 | Jacob | A61M 16/024 128/203.14 |
| 2012/0227484 | A1 * | 9/2012 | Chen | A61M 5/14 73/304 R |
| 2012/0232471 | A1 * | 9/2012 | Chen | A61M 1/1607 604/82 |
| 2015/0025446 | A1 * | 1/2015 | Jacobson | A61M 5/16804 604/22 |
| 2015/0027204 | A1 * | 1/2015 | Stoks | G01K 1/14 73/31.05 |
| 2015/0033847 | A1 * | 2/2015 | Chen | A61M 1/28 73/304 C |
| 2015/0306335 | A1 * | 10/2015 | Winski | A61M 16/16 128/203.14 |
| 2015/0328423 | A1 | 11/2015 | Siew et al. | |
| 2016/0339200 | A1 * | 11/2016 | Bath | A61M 16/16 |
| 2017/0266408 | A1 * | 9/2017 | Giovannelli | A61M 16/16 |
| 2017/0319809 | A1 * | 11/2017 | Biba | G01F 23/2922 |
| 2018/0031407 | A1 | 2/2018 | Kopansky et al. | |
| 2018/0299317 | A1 | 10/2018 | Truong et al. | |
| 2019/0041074 | A1 * | 2/2019 | Minakian | G01F 23/266 |
| 2019/0041075 | A1 * | 2/2019 | Sarkar | F24F 11/62 |
| 2019/0041084 | A1 * | 2/2019 | Atkins, Jr. | F24F 6/14 |
| 2020/0033257 | A1 * | 1/2020 | Degner | G01J 3/427 |
| 2020/0121881 | A1 | 4/2020 | Scheiner et al. | |
| 2020/0121883 | A1 * | 4/2020 | Biba | B01D 46/0002 |
| 2023/0120490 | A1 * | 4/2023 | Biba | B01D 46/0002 128/205.12 |
| 2023/0355909 | A1 * | 11/2023 | Biba | B01D 46/0002 |

FOREIGN PATENT DOCUMENTS

| | | |
|---|---|---|
| CN | 209500458 U | 10/2019 |
| DE | 102011010614 A | 8/2021 |
| EP | 1481702 A2 | 12/2004 |
| EP | 3643348 A1 | 4/2020 |
| FR | 2672390 A | 2/1991 |
| WO | 2015/193833 A2 | 12/2015 |

OTHER PUBLICATIONS

Bishop, Owen. Understand Amplifiers, Contents. p. v. Newnes, 1998.ISBN 9780750637435. doi.org/10.1016/B978-075063743-5/50026-X. (Year: 1998).*
Search Report from Intellectual Property Office of Great Britain for GB1902508.9, dated Aug. 21, 2019.
International Search Report for PCT/EP2020/054919, dated Jun. 9, 2020.
International Preliminary Report on Patentability for PCT/EP2020/054919, dated Aug. 25, 2021.

* cited by examiner

HUMIDIFIERS FOR RESPIRATORY GASES

This application is a national stage application under 35 U.S.C. § 371 of PCT Application No. PCT/EP2020/054919, filed Feb. 25, 2020, which claims the priority benefit of Great Britain Patent Application No. 1902508.9, filed Feb. 25, 2019, which is hereby incorporated by reference in its entirety.

The present invention relates to humidifiers for respiratory gases, and in particular to methods and apparatus for detecting the state of a water reservoir chamber in a humidifier for respiratory gases.

In a healthy person, the function of breathing is entirely spontaneous. The brain senses a build-up of carbon dioxide in the blood and immediately calls for more oxygen. This oxygen is taken into the body by spontaneous inspiration and carbon dioxide is removed in the passive exhalation phase of respiration. A healthy person generates a certain amount of humidity, which is used in the lung to stop the build-up of secretions.

The ability to breathe spontaneously may be lost for a number of reasons. Examples are as a result of surgical procedures (post-operatively), as a result of certain muscular disorders affecting the lung, or as a result of sedation by a clinician. Patients thus affected must be ventilated by mechanical means in order to achieve oxygenation and carbon dioxide removal.

When a patient is mechanically ventilated, it is essential that the humidity of the air is maintained at a sufficiently high level. This is conventionally achieved using a heat moisture exchanger (HME) or a humidifier. An HME retains the moisture in an exhaled breath and this moisture is sent back to the lung with the next inspiratory phase. In a humidifier, the inspiratory gas is passed through a heated humidification chamber containing a water reservoir, and the inspiratory gas picks up humidity prior to entering the lung.

Conventional humidifiers comprise a humidification chamber containing a reservoir of water, and a base with a heater plate for heating the water reservoir of the humidification chamber. The humidification chamber also comprises two ports through which gases enter and exit the humidification chamber, such that respiratory gases flow over the surface of the heater water reservoir. Furthermore, many humidification chambers include means for replacing water that is lost from the humidification chamber, so as to maintain the level of the water relatively constant. Such means typically takes the form of a fluid inlet including a valve for controlling the flow of liquid into the chamber. The valve typically has a float actuator, whereby the rise and fall of the float actuator, in use, acts to open and close the valve so as to maintain the level of the water in the humidification chamber relatively constant.

It is known for humidifiers to include means for detecting when there is insufficient water in the humidification chamber and triggering an alarm when this occurs. This may occur because the float-valve is malfunctioning, or the supply of water is blocked or disconnected. Existing humidifier bases for providing an alarm when there is insufficient water in the humidification chamber suffer from a number of disadvantages, including complexity and cost of manufacture.

There has now been devised an improved sensor and method for determining the state of a humidification chamber in a respiratory gas humidifier which overcome or substantially mitigate the abovementioned and/or other disadvantages associated with the prior art.

According to a first aspect of the invention, there is provided a sensor for determining the state of a humidification chamber in a respiratory gas humidifier, the sensor comprising a transmitter for emitting an electromagnetic radiation signal, a receiver for receiving the electromagnetic radiation signal and providing an output signal, and a controller for varying the intensity of the electromagnetic radiation signal emitted by the transmitter and/or the gain setting of the receiver, the controller having two sensor configurations, a first configuration in which the transmitter emits an electromagnetic radiation signal having a first intensity, the receiver has a first gain setting, and the receiver provides a first output signal, and a second configuration in which the transmitter emits an electromagnetic radiation signal having a second intensity, the receiver has a second gain setting, and the receiver provides a second output signal, wherein the first intensity is different to the second intensity, and/or the first gain setting is different to the second gain setting, and the controller determines a state of the humidification chamber by comparing the first and second outputs of the receiver with one or more threshold values.

According to a second aspect of the invention, there is provided a method of determining the state of a humidification chamber in a respiratory gas humidifier using the sensor as defined above, the method comprising the steps of:
 (a) emitting a first electromagnetic radiation signal having a first intensity from the transmitter, and receiving the first electromagnetic radiation signal at the receiver having a first gain setting, such that the receiver provides a first output signal;
 (b) emitting a second electromagnetic radiation signal having a second intensity from the transmitter, and receiving the second electromagnetic radiation signal at the receiver having a second gain setting, such that the receiver provides a second output signal; and
 (c) comparing the first and second output signals of the receiver with one or more threshold values, thereby determining a state of the humidification chamber,
 wherein the first intensity is different to the second intensity, and/or the first gain setting is different to the second gain setting.

According to a third aspect of the invention, there is provided a method of determining the state of a humidification chamber in a respiratory gas humidifier, the method comprising the steps of:
 (a) emitting a first electromagnetic radiation signal having a first intensity from a transmitter, and receiving the first electromagnetic radiation signal at a receiver having a first gain setting, such that the receiver provides a first output signal;
 (b) emitting a second electromagnetic radiation signal having a second intensity from a transmitter, and receiving the second electromagnetic radiation signal at a receiver having a second gain setting, such that the receiver provides a second output signal; and
 (c) comparing the first and second outputs of the receiver with one or more threshold values, thereby determining a state of the humidification chamber,
 wherein the first intensity is different to the second intensity, and/or the first gain setting is different to the second gain setting.

According to a fourth aspect of the invention, there is provided a sensor for determining a fault with a humidification chamber in a respiratory gas humidifier, the sensor comprising a transmitter for emitting an electromagnetic radiation signal, a receiver for receiving the electromagnetic radiation signal and providing an output signal, and a controller for varying the intensity of the electromagnetic radiation signal emitted by the transmitter and/or the gain setting of the receiver, the controller having two sensor configurations, a first configuration in which the transmitter emits an electromagnetic radiation signal having a first intensity, the receiver has a first gain setting, and the receiver provides a first output signal, and a second configuration in which the transmitter emits an electromagnetic radiation signal having a second intensity, the receiver has a second gain setting, and the receiver provides a second output signal, wherein the first intensity is different to the second intensity, and/or the first gain setting is different to the second gain setting, and the controller determines a state of the humidification chamber by comparing the first and second outputs of the receiver with one or more threshold values, and determines whether to indicate a fault with the humidification chamber based on the determined state of the humidification chamber.

According to a fifth aspect of the invention, there is provided a method of determining a fault with a humidification chamber in a respiratory gas humidifier, the method comprising the steps of:

(a) emitting a first electromagnetic radiation signal having a first intensity from a transmitter, and receiving the first electromagnetic radiation signal at a receiver having a first gain setting, such that the receiver provides a first output signal;

(b) emitting a second electromagnetic radiation signal having a second intensity from a transmitter, and receiving the second electromagnetic radiation signal at a receiver having a second gain setting, such that the receiver provides a second output signal;

(c) comparing the first and second outputs of the receiver with one or more threshold values, thereby determining a state of the humidification chamber; and (d) determining whether to indicate a fault with the humidification chamber based on the determined state of the humidification chamber, wherein the first intensity is different to the second intensity, and/or the first gain setting is different to the second gain setting.

The sensor and methods according to the invention are advantageous principally because the variation of the intensity of the electromagnetic radiation emitted by the transmitter and/or the variation of the gain setting of the receiver provides first and second output signals, which may be provided by a single transmitter-receiver pair, and which may enable different states of the humidification chamber to be resolved relative to one or more threshold values. This may further enable determination of whether there is a fault with the humidification chamber and/or operation of the humidification chamber.

It will be appreciated that where integers are referred to as first and second, this does not infer that those integers are necessarily different, unless explicitly stated.

The sensor and methods according to the invention may determine a state of the humidification chamber from at least three different states. The at least three different states may relate to the status of the humidification chamber. For example, the at least three different states may relate to the presence and/or the fill level of the humidification chamber. The at least three different states may correspond to (i) a humidification chamber being present and the level of the water reservoir being above a threshold level (ie a no fault state), (ii) a humidification chamber being present and the level of the water reservoir being below a threshold level (ie a low water fault), and (iii) a humidification chamber not being present (ie a missing chamber fault).

It may be determined whether the humidification chamber is in the first state based directly on the comparison of the first output with one of the threshold values. It may be determined whether the humidification chamber is in the first state based solely on the comparison of the first output signal with one of the threshold values. It may be determined whether the humidification chamber is in the second state or the third state based on the comparison of the second output with one of the threshold values. The threshold value with which the first output is compared may be different to the threshold value with which the second output is compared.

After comparison of the first output signal with the first threshold value, it may be determined that the humidification chamber is in either i) a first state, or ii) one of two further states, ie one of a second state and a third state. The two further states may be indistinguishable or unresolvable at this stage, ie by comparing the first output signal with the first threshold value, or may at least be close enough to require further validation. For example, the two further states may result in first electromagnetic radiation signals that have similar intensities, for example within 1%, 5% or 10% of one another. Hence, the two further states may produce first output signals that have similar intensities, for example within 1%, 5% or 10% of one another.

Where it is determined that the humidification chamber is in i) a first state, the method may end, ie the method may not progress to comparing the second output signal with a second threshold value. Where it is determined that the humidification chamber is in ii) one of the two further states, the second output signal may be compared with a second threshold value to determine whether the humidification is in the second state or the third state. For example, determining a state of the humidification chamber may comprise a first comparison stage in which the first output signal is compared with a first threshold value, and a first output stage in which, dependent on the first comparison stage, it is output that the humidification chamber is either i) in a first state or that ii) the humidification chamber is not in the first state and that a second comparison stage and a second output stage are required to determine which of a second state and a third state the humidification chamber is in.

Dependent on the output of the first output stage, determining a state of the humidification chamber may therefore further comprise a second comparison stage in which the second output signal is compared with a second threshold value, and a second output stage in which, dependent on the second comparison stage, it is output that the humidification chamber is either iii) in a second state or iv) in a third state.

The second threshold value may be different to the first threshold value. Each of the three states may be different states.

Where the method is a method of determining a fault with a humidification chamber, or the sensor is a sensor for determining a fault with a humidification chamber, determining whether to indicate a fault with the humidification chamber may be based on the comparison of the first output with one of the threshold values and/or the comparison of the second output with one of the threshold values.

The first output signal may be obtained and then compared to a first threshold value before the second output signal is obtained and then compared to a second threshold value. Alternatively, the first and second output signals may be obtained and then compared to first and second threshold values. The method steps defined above may be repeated at intervals, such that a regular determination of the state of the humidification chamber is obtained.

The second intensity and/or the second gain setting may be decreased relative to the first intensity and/or the first gain setting. In this example, in response to the first output signal being lower than a first threshold value, it may be determined that the humidification chamber is in a first state. The first state may be that there is no fault with the humidification chamber, ie the humidification chamber contains water. In response to the first output signal being higher than the first threshold value, the second output signal may be compared with a second threshold value. In response to the second output signal being lower than the second threshold value, it may be determined that the humidification chamber is in a second state.

The second state may be that the humidification chamber is empty or near empty. In response to the second output signal being higher than the second threshold value, it may be determined that the humidification chamber is in a third state. The third state may be that the humidification chamber is not present.

Alternatively, the second gain setting and/or the second intensity may be increased relative to the first gain setting and/or the first intensity, ie the second gain setting may be higher than the first gain setting and/or the second intensity may be higher than the first intensity. In this example, in response to the first output signal being higher than a first threshold value, it may be determined that the humidification chamber is in a first state. The first state may be that the humidification chamber is not present. In response to the first output signal being lower than the first threshold value, the second output may be compared with a second threshold value. In response to the second output being lower than the second threshold value, it may be determined that the humidification chamber is in a second state. The second state may be that there is no fault with the humidification chamber, ie the humidification chamber contains water. In response to the second output being higher than the second threshold value, it may be determined that the humidification chamber is in a third state. The third state may be that the humidification chamber is empty or near empty.

These features of the sensor and methods are further advantageous because the comparison of multiple output signals with multiple threshold values allows different states of the humidification chamber, which otherwise produce a similar output signal at the receiver, to be reliably distinguished.

In response to determining that the humidification chamber is empty or near empty, an alarm signal may be initiated. The alarm signal may be a visual signal. The alarm signal may be an audio signal. The alarm signal may be a combination of audio and visual signals. The alarm signal may be initiated in the vicinity of the humidification chamber and/or the alarm signal may be initiated at a remote location.

Alternatively, in response to determining that the humidification chamber is empty or near empty, automatic refilling of the humidification chamber may be initiated.

In response to determining that the humidification chamber is not present, an alarm signal may be initiated. The alarm signal may be a visual signal. The alarm signal may be an audio signal. The alarm signal may be a combination of audio and visual signals. The alarm signal may be initiated in the vicinity of the humidification chamber and/or the alarm signal may be initiated at a remote location.

Alternatively, in response to determining that the humidification chamber is not present, automatic replacement of the humidification chamber may be initiated.

These features of the sensor and methods are further advantageous because the raising of an alarm signal or automatic refilling ensures that the humidification chamber fault is resolved or repaired as quickly as possible.

The controller may have a third sensor configuration in which the transmitter emits a reference electromagnetic radiation signal having a third intensity, the receiver has a third gain setting, and the receiver provides a third output signal. The third intensity may be a minimum intensity and the third gain setting may be a minimum gain setting.

The method according to the second aspect of the invention and/or the third aspect of the invention may further comprise the steps of emitting a third reference electromagnetic radiation signal having a third intensity from the transmitter, and receiving the third reference electromagnetic radiation signal at the receiver having a third gain setting, such that the receiver provides a third output signal. The steps of emitting the third reference electromagnetic radiation signal from the transmitter and receiving the third reference electromagnetic radiation signal at the receiver may occur before comparison of the first output signal and/or the second output signal with one or more threshold values. The third gain setting may be a minimum gain. The third intensity may be a minimum intensity.

The third output signal may account for radiation received at the receiver as a result of ambient radiation and/or environmental conditions. The third output signal may be subtracted from the second output signal to produce a calibrated second output signal. This may occur before the second output signal is compared with the second threshold value. Comparing the second output signal with the second threshold value may therefore comprise comparing the calibrated second output signal with the second threshold value.

Similarly, the third output signal may be subtracted from the first output signal to produce a calibrated first output signal. This may occur before the first output signal is compared with the first threshold value. Comparing the first output signal with the first threshold value may therefore comprise comparing the calibrated first output signal with the first threshold value.

The first threshold value may be determined by characteristic data representing previously received values for each of the first, second and third states. The second threshold value may be determined by characteristic data representing previously received values for each of the first, second and third states.

According to a sixth aspect of the invention there is provided a computer-readable storage medium comprising instructions which, when executed by a computer, cause the computer to carry out the method according to the second and/or third and/or fifth aspect of the invention.

According to a seventh aspect of the invention there is provided a humidifier for carrying out the method according to the second or fifth aspect of the invention. The humidifier comprises a humidification chamber, and a sensor according to the first or fourth aspect of the invention. The transmitter and the receiver may be positioned at opposing walls of the humidification chamber. The humidifier may have a single transmitter-receiver pair.

The humidifier may further comprise a heater, for heating water stored within the humidification chamber in use. The heater may comprise a plate upon which the humidification chamber is located, in use. The humidifier may further comprise a controller for implementing the method according to the second and/or third aspect of the invention. The humidifier may further comprise an alarm for emitting the alarm signal.

The humidification chamber may comprise an inlet for supplying gas flow to the interior of humidification chamber. The humidification chamber may comprise an outlet for supplying heated and/or humidified gas flow from the humidification chamber to another component of a breathing system, such as a respiratory tube. The inlet and/or the outlet may be of conventional shape and dimensions for physical connection of respiratory tubes.

The humidification chamber may be removably engageable with a humidifier base, and may be positioned on the humidifier base, in use. The humidification chamber may comprise a valve for regulating the flow of water into the humification chamber, for example to maintain a substantially constant level of water, in use, and the valve may comprise a float positioned within the water reservoir in the humidification chamber, in use. The transmitter and the receiver may be positioned at opposing walls of the humidification chamber. The transmitter and receiver may be mounted to the humidifier base, and arranged such that the theoretical straight-line path between them is intersected by the water reservoir within a humidification chamber engaged with the humidifier base. The path between the transmitter and receiver may be offset from the centre of a humidification chamber engaged with the humidifier base, and may be to the side of any valve or float in the humidification chamber. The transmitter and receiver may be positioned anywhere on the humidifier base provided the different chamber states effect a measurable change on the electromagnetic radiation signals received at the receiver, the chamber states corresponding to (i) a humidification chamber being present and the level of the water reservoir being above a threshold level (ie a no fault state), (ii) a humidification chamber being present and the level of the water reservoir being below a threshold level (ie a low water fault), and (iii) a humidification chamber not being present (ie a missing chamber fault).

The transmitter may have more than two intensity settings and the receiver may have more than two gain settings where further distinction is required to resolve a greater number of parameters. The transmitter may have three, four, five, six or seven intensity settings. The receiver may have three, four, five, six or seven gain settings. Where more intensity or gain settings are implemented, more control may be required so that each combination of intensity and gain settings is tested sequentially.

The transmitter may be a source of either visible or infrared radiation, and may be a source of infrared radiation. The first and second electromagnetic radiation signals may have the same wavelength, and may have a wavelength in the range of 400 nm to 15 µm, or preferably in the range of 400-1000 nm. The transmitter may be an LED.

The receiver may be a photodiode, and may include an amplifier to which a gain setting is applied.

Practicable embodiments of the invention will now be described, with reference to the accompanying drawings, of which.

Figure 1:
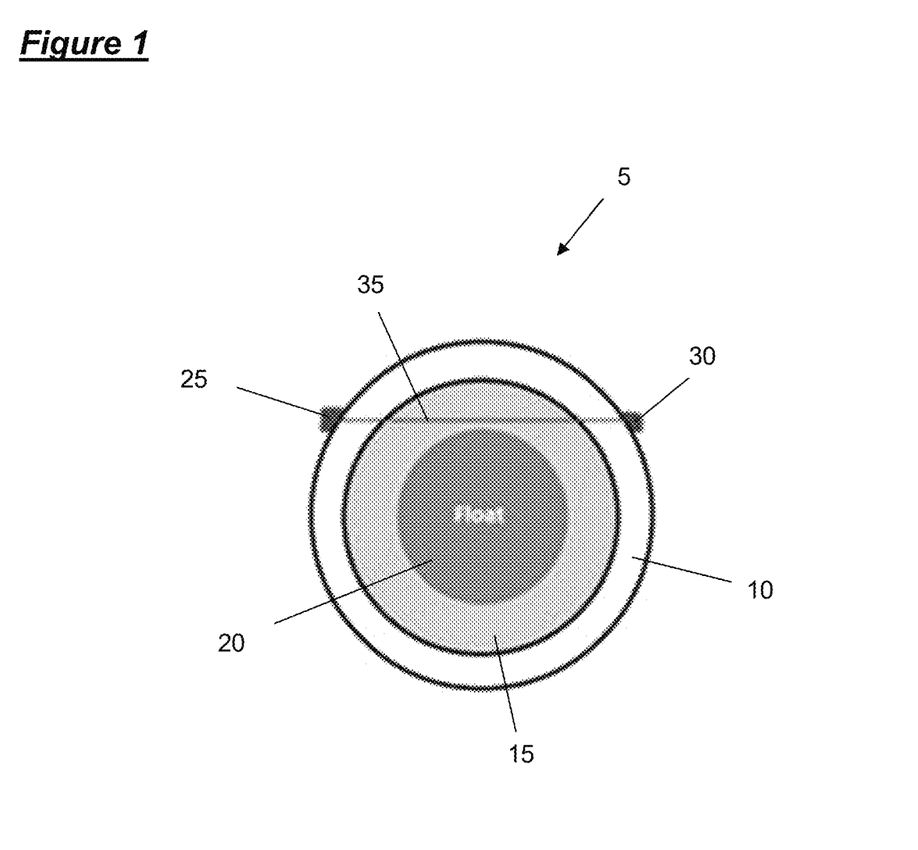
FIG. 1 is a plan view of a humidifier base.

FIG. 1 illustrates a humidifier 5 having a humidification chamber 10. The humidification chamber 10 is filled with water 15 and a float 20 sits within the water 15. The float 20 forms part of a float-valve (not shown), which cooperates with a water supply tube to supply water to the humidification chamber 10 and maintain the level of the water in the humidification chamber 10 at a substantially constant level. A transmitter 25 and a receiver 30 are located on a humidifier base (not shown) at opposing walls of the humidification chamber 10. The transmitter 25 is an electromagnetic radiation source such as a light source, ie a LED. The receiver 30 is configured to detect the specific electromagnetic radiation transmitted by the transmitter 25. The transmitter 25 and receiver 30 are positioned at opposing sides of the humidification chamber 10 such that the theoretical path 35 between them avoids contact with the float 20.

Figure 2:
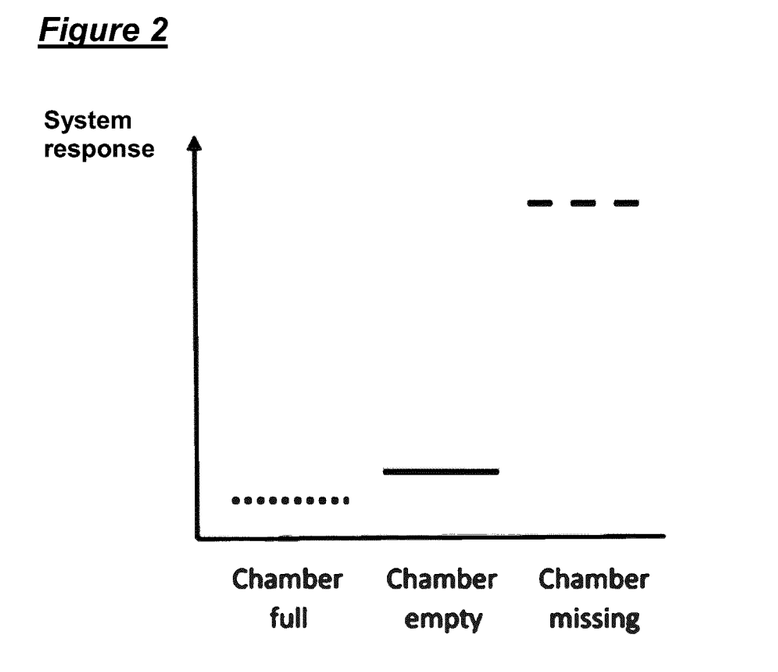
FIG. 2 is a graph showing the system response to electromagnetic radiation received at the receiver of the humidifier base when electromagnetic radiation is transmitted at a low intensity and received at a low gain setting, for various humidification chamber states.

FIG. 2 illustrates the system response to radiation detected at the receiver 30 when the transmitter 25 emits electromagnetic radiation at a low intensity and the receiver 30 receives the electromagnetic radiation at a low gain setting. At a low gain setting and a low intensity, it can be seen that the system response to electromagnetic radiation received at the receiver 30 when the chamber is missing is noticeably different to the system response to electromagnetic radiation received at the receiver 30 when the chamber is full or when the chamber is empty. However, the system response to electromagnetic radiation received at the receiver 30 when the chamber is empty is not noticeably different to the system response to electromagnetic radiation received at the receiver 30 when the chamber is full, and it is therefore difficult to distinguish between these chamber states.

Figure 3:
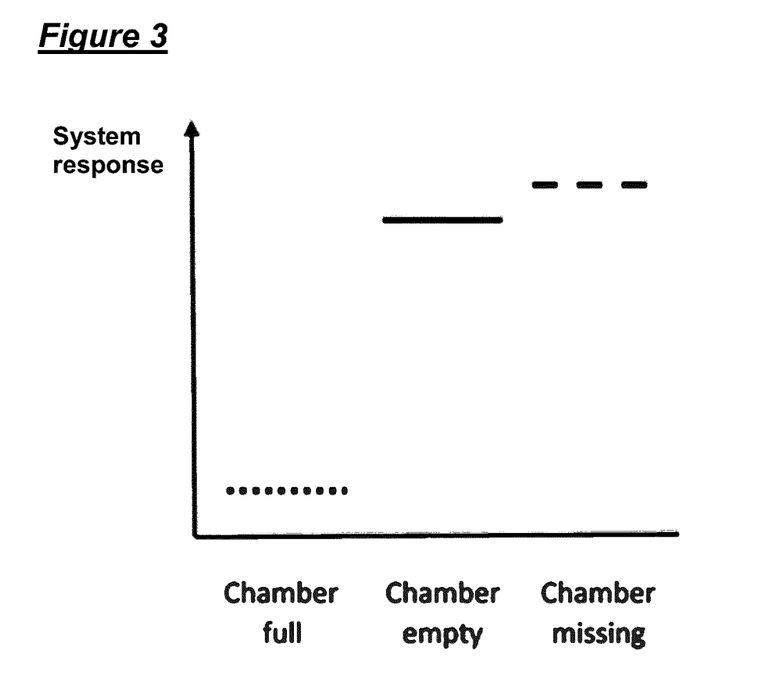
FIG. 3 is a graph showing the system response to electromagnetic radiation received at the receiver of the humidifier base when electromagnetic radiation is transmitted at a higher intensity than the intensity of FIG. 2 and/or received at a higher gain setting than the gain setting of FIG. 2, for various humidification chamber states.

Hence, if the emitter-receiver configuration explained in relation to FIG. 2 is implemented initially, in order to distinguish when the chamber is empty from when the chamber is full, it is necessary to change the emitter 25 to emit electromagnetic radiation at a higher intensity relative to the intensity in the example of FIG. 2 and/or the receiver 30 to receive at a higher gain setting relative to the example of FIG. 2. As a result of an increase in the gain setting and/or the intensity of the electromagnetic radiation emitted by the transmitter 25, the system response to electromagnetic radiation received at the receiver 30 when the chamber is empty is noticeably different to the system response to electromagnetic radiation received at the receiver 30 when the chamber is full. This allows distinction between these chamber states.

This difference is indicated by FIG. 3. FIG. 3 illustrates the system response to radiation received at the receiver 30 when the emitter 25 emits electromagnetic radiation at a high intensity and the receiver 30 receives the electromagnetic radiation at a high gain setting. At a high gain setting and a high intensity, it can be seen that the system response to electromagnetic radiation received at the receiver 30 when the chamber is full is noticeably different to the system response to electromagnetic radiation received at the receiver 30 when the chamber is missing or when the chamber is empty. However, the system response to electromagnetic radiation received at the receiver 30 when the chamber is empty is not noticeably different to the system response to electromagnetic radiation received at the receiver 30 when the chamber is missing, and it is therefore difficult to distinguish between these chamber states.

Hence, if the emitter-receiver configuration explained in relation to FIG. 3 were to be implemented initially, in order to distinguish when the chamber is empty from when the chamber is missing, it is necessary to change the emitter 25 to emit electromagnetic radiation at a lower intensity relative to the intensity in the example of FIG. 3 and/or the receiver 30 to receive the electromagnetic radiation at a lower gain setting relative to the gain setting in the example of FIG. 3 (ie revert towards the system response illustrated in FIG. 2, although not necessarily both low intensity and low gain setting as described in relation to FIG. 2). As a result of a decrease in the gain setting and/or the intensity of the electromagnetic radiation emitted by the transmitter 25, the system response to electromagnetic radiation received at the receiver 30 when the chamber is empty is noticeably different to the system response to electromagnetic radiation received at the receiver 30 when the chamber is missing. This allows distinction between these chamber states.

It is worth noting that the graphs of FIGS. 2 and 3 are not necessarily to scale, nor do they represent the exact movement of a system between different settings, but they are produced in this way for simplicity of explanation. That is, increasing the intensity and/or the gain setting of the system in FIG. 2 will not produce the exact graph of FIG. 3. On the contrary, as you increase the intensity and/or the gain setting in FIG. 2, all three of the chamber state lines would rise such that the 'chamber full' and 'chamber empty' lines would appear as they do in FIG. 3, but the 'chamber missing' line would be off the chart. Similarly, reducing the intensity and/or the gain setting of the system in FIG. 3 will not produce the exact graph of FIG. 2. On the contrary, as you decrease the intensity and/or the gain setting in FIG. 3, all three of the chamber states would lower such that the 'chamber empty' and 'chamber missing' lines would appear as they do in FIG. 2, but the 'chamber full' line would have dropped off the chart.

Where the intensity and the gain settings are referred to as being low, the term low is intended to mean lower than when the intensity and the gain settings are referred to as being high, but always high enough to receive a detectable signal at the receiver 30. That is, when the intensity and the gain settings are referred to as being low, this does not mean that they are at a minimum.

In theory, either the intensity or the gain can be increased/reduced to move between the configurations of FIGS. 2 and 3, however if the intensity setting is too low, then a viable signal may not be achievable at the receiver 30, since the amount of electromagnetic radiation received at the receiver 30 as a result of ambient light overwhelms the electromagnetic radiation received as a result of the transmitter 25.

Hence, it is preferable to increase the intensity to be able to establish whether the chamber is full or not, and it is preferable to reduce the gain to distinguish between the chamber being empty and the chamber missing.

The system responses referred to in relation to FIGS. 2 and 3 are referred to as output signals in the following description of the methods illustrated in FIGS. 4 and 5.

Figure 4:
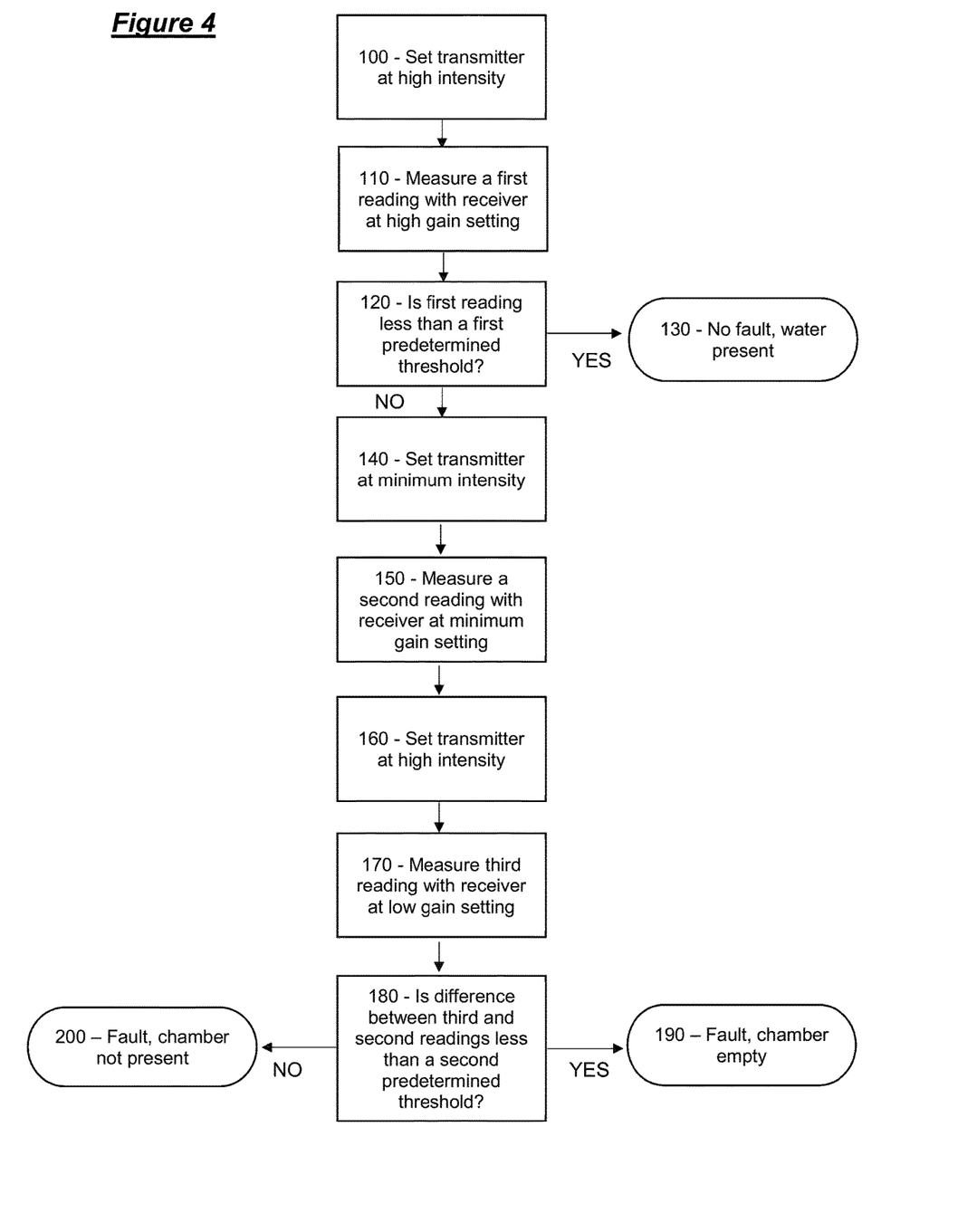
FIG. 4 is a flow diagram illustrating a first method of determining the state of the humidification chamber of the humidifier base of FIG. 1.

FIG. 4 illustrates a first method by which any of the three aforementioned humidification chamber states is determined. The method is implemented by a controller. The controller may be an integral part of the humidifier 5 or located remotely of the humidifier 5 for control by a remote user.

At step 100, the method is initiated by the transmitter 25 emitting electromagnetic radiation at a high intensity. At step 110 the receiver 30 receives at least some of the electromagnetic radiation emitted at step 100 at a high gain setting. The exact amount of electromagnetic radiation received at step 110 depends on the state of the humidification chamber 10. The received electromagnetic radiation is converted into a first output signal. At step 120, the first output signal generated at step 110 is compared with a first predetermined threshold. The first predetermined threshold is determined by characteristic data of previously received values for each of the chamber states. If the first output signal is less than the first predetermined threshold, then at step 130 it is determined that there is no fault with the humidification chamber, ie there is water present and the humidification chamber is operating as normal.

If it is determined that there is no fault with the humidification chamber, then the method ends at step 130. If the first output signal is greater than the first predetermined threshold, then it is determined that there is a fault with the humidification chamber, ie the humidification chamber is emptied of water or there is no humidification chamber present at all, and the method continues.

At step 140, the transmitter 25 emits radiation of a minimum intensity and at step 150, the receiver 30 receives at least some of the electromagnetic radiation emitted at step 140 at a minimum gain setting. The received electromagnetic radiation is converted into a second output signal. The second output signal acts as a reference point, indicating the amount of electromagnetic radiation received at the receiver 30 as a result of ambient light such as sunlight and/or room lighting. Here, the terms 'minimum intensity' and 'minimum gain setting' refer to the intensity and gain setting at which ambient conditions are detectable by the receiver.

At step 160, the transmitter 25 emits radiation of a high intensity. At step 170, the receiver 30 receives at least some of the electromagnetic radiation emitted at step 160 at a minimum gain setting and converts the received electromagnetic radiation into a third output signal. The exact amount of electromagnetic radiation received at step 170 will depend on whether the humidification chamber is empty or missing.

The second and third output signals produced at steps 150 and 170 are then compared at step 180 and the difference between the output signals is compared with a second predetermined threshold. The second predetermined threshold is determined by characteristic data of previously received values for each of the chamber states. If the difference between the second and third output signals (ie the total radiation received as a result of the transmitter 25 and any ambient light conditions, minus the radiation received as a result of ambient light conditions) is less than the second predetermined threshold, then at step 190 it is determined that the chamber is empty. In response to this determination, an alarm signal is effected that the chamber needs refilling.

If the difference between the second and third output signals is more than the second predetermined threshold, then at step 200 it is determined that the chamber is missing. In response to this determination, an alarm signal is effected to signal that the chamber needs replacing before continued use.

Figure 5:
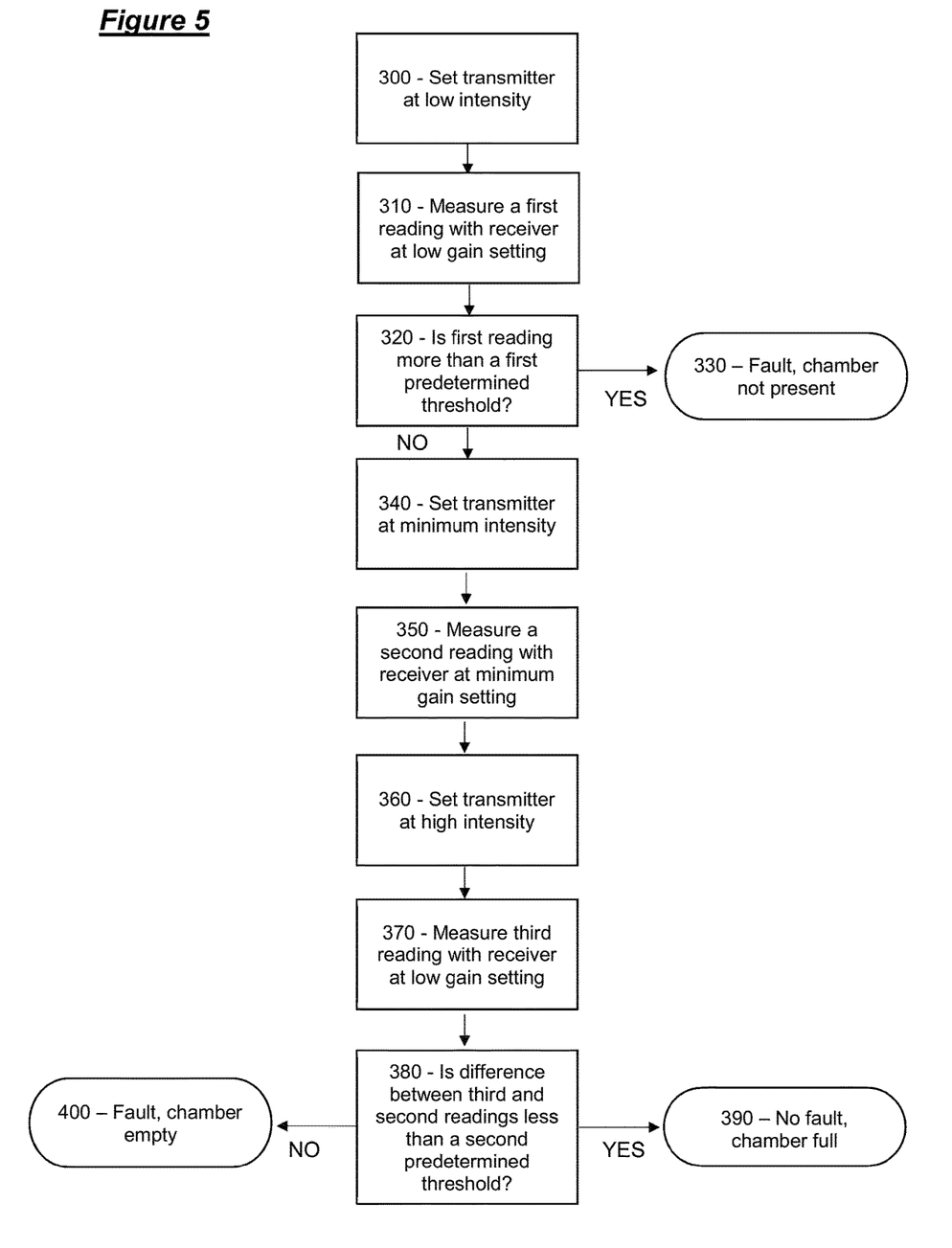
FIG. 5 is a flow diagram illustrating a second method of determining the state of the humidification chamber of the humidifier base of FIG. 1.

FIG. 5 illustrates a second method by which any of the three aforementioned humidification chamber states is determined. The method is implemented by a controller. The controller may be an integral part of the humidifier 5 or located remotely of the humidifier 5 for control by a remote user.

At step 300, the method is initiated by the transmitter 25 emitting electromagnetic radiation at a low intensity. At step 310 the receiver 30 receives at least some of the electromagnetic radiation emitted at step 300 at a low gain setting. The exact amount of electromagnetic radiation received at step 310 depends on the state of the humidification chamber 10. The received electromagnetic radiation is converted into a first output signal. At step 320, the first output signal generated at step 310 is compared with a first predetermined threshold. The first predetermined threshold is determined by characteristic data of previously received values for each of the chamber states. If the first output signal is more than the first predetermined threshold, then at step 330 it is determined that the humidification chamber is missing, ie there is a fault with operation. In response to this determination, an alarm signal is effected to signal that the chamber needs replacing before continued use.

If it is determined that the humidification chamber is missing, then the method ends at step 330. If the first electrical signal is less than the first predetermined threshold, then the method continues to step 340.

At step 340, the transmitter 25 emits radiation of a minimum intensity and at step 350, the receiver 30 receives at least some of the electromagnetic radiation emitted at step 340 at a minimum gain setting. The received electromagnetic radiation is converted into a second output signal. The second output signal acts as a reference point, indicating the amount of electromagnetic radiation received at the receiver 30 as a result of ambient light such as sunlight and/or room lighting.

At step 360, the transmitter 25 emits radiation of a high intensity. At step 370, the receiver 30 receives at least some of the electromagnetic radiation emitted at step 360 at a low gain setting and converts the received electromagnetic radiation into a third output signal. The exact amount of electromagnetic radiation received at step 370 will depend on whether the humidification chamber is empty or full.

The second and third output signals produced at steps 350 and 370 are then compared at step 380 and the difference between the output signals is compared with a second predetermined threshold. The second predetermined threshold is determined by characteristic data of previously received values for each of the chamber states. If the difference between the second and third output signals (ie the total radiation received as a result of the transmitter 25 and any ambient light conditions, minus the radiation received as a result of ambient light conditions) is less than the second predetermined threshold, then at step 390 it is determined that the chamber is full, ie there is no fault with operation.

If the difference between the second and third output signals is more than the second predetermined threshold, then at step 400 it is determined that the chamber is empty, ie there is a fault in operation. In response to this determination, an alarm signal is effected to signal that the chamber needs refilling.

Theoretically, in either of the above-described methods, at step 160,360 the transmitter 25 may emit electromagnetic radiation of low intensity and at step 170,370 the receiver 30 may receive the electromagnetic radiation at a high gain setting. That is, as described in relation to FIGS. 2 and 3, provided at least one of the gain setting of the receiver 30 and the intensity of the electromagnetic radiation emitted by emitter 25 is increased or decreased between steps 100,300 and 160,360 and steps 110,310 and 170,370, the method will be able to distinguish between each of the three chamber states discussed. However, the intensity of the electromagnetic radiation emitted by the emitter 25 at step 140,340 and the gain setting of the receiver at step 150,350 must both be set to minimum to provide a reference point to account for ambient light conditions. However, in practice, this is less preferable, since the intensity setting being lower than the gain setting may lead to the amount of electromagnetic radiation received at the receiver 30 as a result of ambient light overwhelming the electromagnetic radiation received as a result of the transmitter 25.

Alternatively, in any of the above-described methods, the transmitter 25 may have more than two intensity settings and the receiver 30 may have more than two gain settings. That is, although the specific methods described above resolve the different humidification chamber states for this application, where further distinction is required to resolve a greater number of parameters, the transmitter 25 may have three, four or five intensity settings, and/or the receiver 30 may have three, four or five gain settings. Of course, it is anticipated that where more intensity or gain settings are implemented, more control is required so that each combination of intensity and gain settings is tested sequentially.

In alternative embodiments, the transmitter 25 and the receiver 30 described in relation to FIG. 1 may be located anywhere on the humidifier base provided the different states of the humidification chamber 10 effect a measurable change on the signal received at the receiver 30.

The invention claimed is:

1. A sensor comprising:
   a transmitter for emitting an electromagnetic radiation signal;
   a receiver for receiving the electromagnetic radiation signal and providing an output signal indicative of a received amount of electromagnetic radiation at the receiver; and
   a controller configured to:
   vary an intensity of the electromagnetic radiation signal emitted by the transmitter and/or a gain setting of the receiver;
   receive the output signal from the receiver; and
   compare a value of the output signal with one or more threshold values, the controller having:
   a first sensor configuration in which the controller causes the transmitter to emit a first electromagnetic radiation signal having a first intensity and the receiver to have a first gain setting, the output signal provided to the controller by the receiver being a first output signal indicative of the amount of the electromagnetic radiation received at the receiver; and
   a second sensor configuration in which the controller causes the transmitter to emit a second electromagnetic radiation signal having a second intensity and the receiver to have a second gain setting, the output signal provided to the controller by the receiver when in the second sensor configuration being a second output signal indicative of the amount of electromagnetic radiation received at the receiver,
   wherein the first intensity is different from the second intensity, and/or the first gain setting is different from the second gain setting, and the controller compares the first output signal with a first threshold value, and determines that a humidification chamber in a respiratory gas humidifier is in either i) a first state, or ii)

a one of two further states, and when it is determined that the humidification chamber is in ii) one of two further states, the controller compares the second output signal with a second threshold value to determine whether the humidification chamber is in a second state or a third state.

2. The sensor according to claim 1, wherein it is determined whether the humidification chamber is in the first state based directly on a comparison of the first output signal with one of the threshold values.

3. The sensor according to claim 1, wherein it is determined whether to indicate a fault with the humidification chamber based directly on a comparison of the first output signal with the first threshold value.

4. The sensor according to claim 1, wherein the first, second, and third states of the humidification chamber determined by the controller comprise (i) the humidification chamber being present and a level of a water reservoir being above a threshold level, (ii) the humidification chamber being present and a level of a water reservoir being below a threshold level, and (iii) the humidification chamber not being present.

5. The sensor according to claim 1, wherein the first output signal is obtained and then compared to a first threshold value before the second output signal is obtained and then compared to a second threshold value.

6. The sensor according to claim 1, wherein the first and second output signals are obtained and then compared to first and second threshold values.

7. The sensor according to claim 1, wherein the determining of the state of the humidification chamber is repeated at intervals, such that a regular determination of the state of the humidification chamber is obtained.

8. The sensor according to claim 1, wherein an alarm signal is initiated in response to determining that the humidification chamber is empty or near empty, and/or in response to determining that the humidification chamber is not present.

9. The sensor according to claim 1, wherein the controller has a third sensor configuration in which the controller causes the transmitter to emit a reference electromagnetic radiation signal having a third intensity and the receiver to have a third gain setting, the output signal provided to the controller by the receiver when in the third sensor configuration being a third output signal indicative of the amount of electromagnetic radiation received at the receiver.

10. The sensor according to claim 9, wherein the third intensity is a minimum non-zero intensity of the transmitter and/or the third gain setting is a minimum non-zero gain setting of the receiver.

11. The sensor according to claim 9, wherein the third output signal is subtracted from the first output signal to produce a calibrated first output signal, and/or the third output signal is subtracted from the second output signal to produce a calibrated second output signal.

12. The sensor according to claim 11, wherein comparing the first output signal with a threshold value comprises comparing the calibrated first output signal with the threshold value, and/or comparing the second output signal with a threshold value comprises comparing the calibrated second output signal with the threshold value.

13. A method of determining the state of a humidification chamber in a respiratory gas humidifier, the method comprising:
emitting a first electromagnetic radiation signal having a first intensity from a transmitter, and receiving the first electromagnetic radiation signal at a receiver having a first gain setting, such that the receiver provides a first output signal to a controller, the first output signal indicative of the amount of electromagnetic radiation received at the receiver;
emitting a second electromagnetic radiation signal having a second intensity from a transmitter, and receiving the second electromagnetic radiation signal at a receiver having a second gain setting, such that the receiver provides a second output signal to a controller, the second output signal indicative of the amount of electromagnetic radiation received at the receiver; and
comparing the first output signal with a first threshold value, and determining that the humidification chamber is in either i) a first state, or ii) one of two further states; and
when it is determined that the humidification chamber is in ii) one of two further states, comparing the second output signal with a second threshold value to determine whether the humidification chamber is in a second state or a third state,
wherein the first intensity is different from the second intensity, and/or the first gain setting is different from the second gain setting.

14. The method according to claim 13, further comprising determining whether to indicate a fault with the humidification chamber based on the determined state of the humidification chamber.

15. The method of claim 13, using the sensor according to claim 1.

16. A humidifier comprising:
a humidification chamber; and
a sensor comprising:
a transmitter for emitting an electromagnetic radiation signal;
a receiver for receiving the electromagnetic radiation signal and providing an output signal indicative of a received amount of electromagnetic radiation at the receiver, the transmitter and the receiver positioned at opposing walls of the humidification chamber; and
a controller configured to:
vary an intensity of the electromagnetic radiation signal emitted by the transmitter and/or a gain setting of the receiver;
receive the output signal from the receiver; and
compare a value of the output signal with one or more threshold values, the controller having:
a first sensor configuration in which the controller causes the transmitter to emit a first electromagnetic radiation signal having a first intensity and the receiver to have a first gain setting, the output signal provided to the controller by the receiver being a first output signal indicative of the amount of the electromagnetic radiation received at the receiver; and
a second sensor configuration in which the controller causes the transmitter to emit a second electromagnetic radiation signal having a second intensity and the receiver to have a second gain setting, the output signal provided to the controller by the receiver when in the second sensor configuration being a second output signal indicative of the amount of electromagnetic radiation received at the receiver, wherein the first intensity is different from the second intensity, and/or the first gain setting is different from the second gain setting, and the controller compares the first output signal with a first threshold value, and determines that the humidification chamber is in either i) a first state, or ii) a one of two further states, and when it is determined that the humidification chamber is in ii) one of two further states, the controller compares the second output signal with a second threshold value to determine whether the humidification chamber is in a second state or a third state.

17. The humidifier of claim 16, wherein the sensor has a single transmitter-receiver pair.

* * * * *